United States Patent
Ettinger

[15] 3,694,611
[45] Sept. 26, 1972

[54] APPARATUS FOR PNEUMATICALLY FEEDING STUDS TO A WELDING GUN

[72] Inventor: Donald H. Ettinger, Royal Oak, Mich.

[73] Assignee: USM Corporation, Warren Division, Mt. Clemens, Mich.

[22] Filed: Dec. 1, 1971

[21] Appl. No.: 203,679

[52] U.S. Cl. ................................................. 219/98
[51] Int. Cl. ................................................ B23k 9/00
[58] Field of Search ............................... 219/98, 99

[56] References Cited

UNITED STATES PATENTS 3,526,744   9/1970   Ehrlich ........................ 219/98

Primary Examiner—R. F. Staubly
Attorney—Burton & Parker

[57] ABSTRACT

A stud welding gun to which studs are sequentially fed by fluid pressure in an axial direction, the gun including a plunger operable to transfer the stud to a welding position and retain it during welding, and a fluid pressure stream coaxial with the plunger for urging the stud toward the welding position, thereby preventing stud jams within the gun.

5 Claims, 3 Drawing Figures

PATENTED SEP 26 1972 3,694,611

APPARATUS FOR PNEUMATICALLY FEEDING STUDS TO A WELDING GUN

BACKGROUND OF THE INVENTION

The present invention relates to welding guns of the type wherein studs are sequentially fed to the gun under fluid pressure, and more particularly to means in the gun for insuring that each stud is delivered to a proper welding position, irrespective of the orientation of the gun during stud delivery.

In delivering elongate studs to welding guns, it has been the practice to provide a stud conduit communicating at one end with a source of studs and at the other end with an axially aligned inlet passage to the gun. The inlet passage is disposed to an acute angle to a stud delivery passage in the gun, and a reciprocable plunger operates to deliver the stud to welding position in the gun collet and to back up the stud during the welding operation. Both gravity and fluid pressure feeds have been employed.

The above described systems function satisfactorily as long as the gun stud delivery passage is maintained in a downwardly extending position causing the stud to be urged by gravity through the passage toward the collet. However, even if a fluid pressure stud feed system is utilized, when the gun is held so that the stud delivery passage extends upwardly from the inlet, the pressure of the fluid is frequently insufficient to propel the stud completely into the gun delivery passage and maintain it there until it is picked up by the plunger. Frequently the stud will fall back toward the inlet, and will be only partially in the gun delivery passage when the plunger is shifted, thereby causing a jam within the gun. When this occurs, the stud must be cleared before another stud can be welded. This is time consuming, and is intolerable in a production environment.

The instant invention is directed to the provision of a stud feed "assist" in the welding gun which ensures that each stud delivered to the gun is properly oriented wholly within the gun delivery passage upon actuation of the plunger to transfer the stud through the delivery passage to its welding position in the gun collet.

DESCRIPTION OF THE PREFERRED EMBODIMENTS

Figure 1:
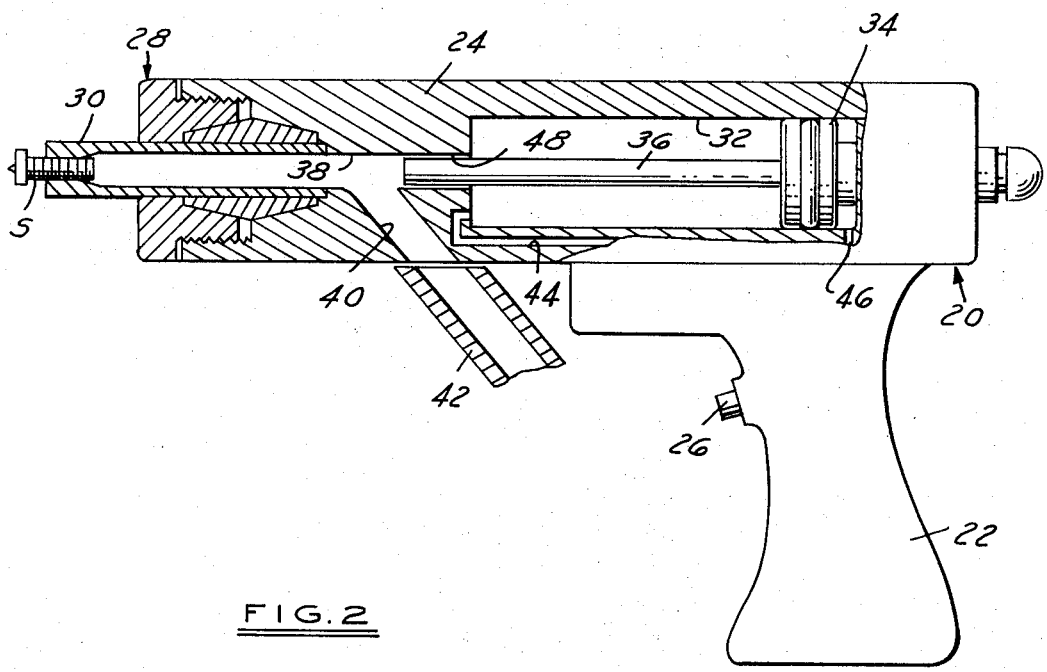
FIG. 1 is a side elevation, partly in cross section, of a welding gun embodying the invention.

Referring now to the drawings, in FIG. 1 there is shown a welding gun 20, which may be of any desired configuration, but is illustrated as a "pistol," having a handle 22 and a barrel 24, with the former provided with a trigger or actuating button 26. The barrel 34 is provided at its forward end with a collet assembly 28 including a hollow collet 30 adapted to hold a stud S in position for welding, and at its rear end with a fluid pressure cylinder 32, within which is disposed a piston 34 having a projecting plunger 36.

Establishing communication between collet 30 and cylinder 32 is a stud delivery passage 38 extending longitudinally therebetween. Intermediate opposite ends of passage 38 and positioned at an acute angle with respect thereto, is a stud inlet passage 40, opening through the barrel wall, in spaced-apart, axial alignment with a stud delivery conduit, the downstream end of which is schematically shown at 42. The end of conduit 42 is secured in any convenient fashion to the gun, the details of the connection not being shown in the interest of clarity.

It is to be understood that while the instant invention is not specifically concerned with the exact character of the welding gun, i.e., whether it be of the drawn arc, percussive, or some other type, it will be obvious to those skilled in the art that the gun 20 may be provided with suitable structure to enable proper operation in one of the many known welding modes. For example, the gun 20 may be constructed in accordance with the disclosure of U. S. Pat. No. 3,546,419, which shows a so-called "drawn arc" welding gun. Neither does the exact type of stud feeding device employed to feed the studs sequentially through the conduit 42 matter, and various stud feeders may be employed, such as vibratory, oscillating or rotating drum, all of which are known in the art.

The cylinder-piston motor 32, 34 is a double acting, pneumatic motor, air being supplied to opposite ends of the cylinder through passages 44 and 46 which are connected by flexible conduits (not shown) to a source of air under pressure. The portion of the passage 38 between inlet passage 40 and cylinder 32, indicated by numeral 48, embraces plunger rod 36, and is dimensioned slightly oversize so as to permit air to flow around and past the rod for the purpose to be described. For example, with a cylindrical rod 36 having a diameter of 0.187 inches, the passage 48 has a diameter between 0.195 and 0.200 inches.

Figure 2:
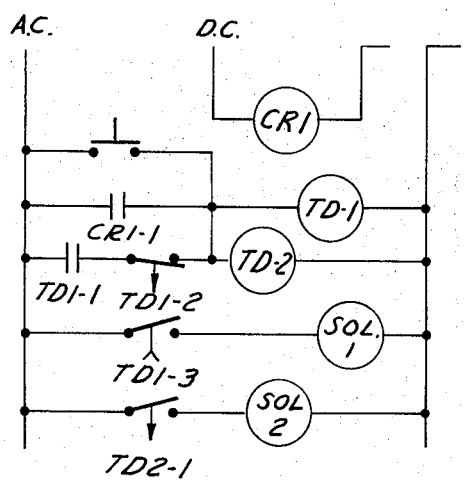
FIG. 2 is a schematic diagram of an electrical control circuit for the gun.
Figure 3:
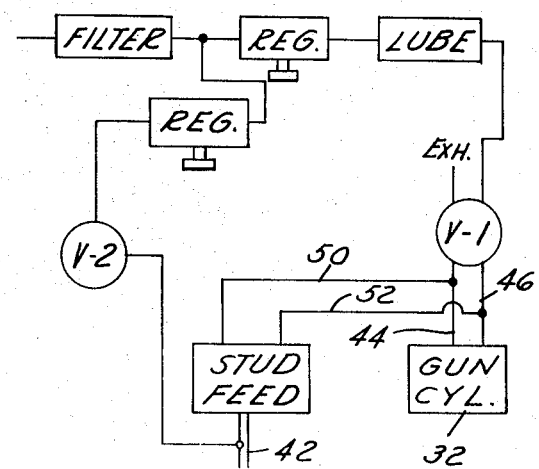
FIG. 3 is a schematic diagram of a pneumatic control circuit for the gun.

Shown in FIGS. 2 and 3 are simplified electrical and pneumatic control circuits for controlling the sequential operation of the system of which the gun is a part, and only that portion of the control circuits necessary to an understanding of the invention has been shown. Briefly, the electrical circuit includes a control relay CR-1 coupled to a source of D.C. power, the relay having a set of normally open contacts CR1-1. A 115 volt AC control circuit as shown includes the contacts CR1-1, a pair of time delay relays TD-1 and TD-2 and a pair of solenoid operated valves SOL.1 and SOL.2.

Assuming that a stud S has been delivered to gun 20, and that air passage 46 has been pressurized to shift plunger rod 36 forwardly to shift the stud to its welding position shown in FIG. 1 and support it during welding, actuation of trigger 26 on the gun initiates the welding cycle, at the conclusion of which relay CR-1 is energized, closing contacts CR1-1 in the control circuit. This energizes TD-1, immediately closing its normally open contacts TD1-1, thereby energizing TD-2 also. Contacts TD1-3 are also closed, completing the circuit to solenoid SOL.1, which controls a four-way valve V-1 (FIG. 3). Energization of SOL.1 shifts valve V-1 to its position pressurizing lines 50 and 44, the former actuating the stud feeder to deliver a stud to conduit 42, and the latter pressurizing the forward end of cylinder 32 to retract piston 34 and plunger rod 36.

After a predetermined time delay sufficient to ensure complete retraction of plunger rod 36, TD-2 times out, closing contacts TD2-1 to energize solenoid SOL.2, which shifts valve V-2 to pressurize conduit 42, thereby blowing the stud therethrough and into stud entry passage 40 in gun 20. As the end of conduit 42 is spaced from the entrance port of passage 40, much of the stud delivery air under pressure will be dissipated, and the stud may not be delivered far enough by the air in conduit 42 to assume its position wholly within passage 38, particularly if the gun is held with the collet 30 pointing upwardly. It the stud lies partially in passage 38 and partially in passage 40 when the plunger rod 36 shifts forwardly, a jam will result and the stud will not be transferred to its welding position.

In order to obviate any stud jams within the gun 20, the passage portion 48 is slightly oversize the plunger rod 36, as pointed out above, whereby upon the pressurization of air passage 44 to retract the plunger 36 pressure air is also supplied to passage 38 through portion 48 to ensure stud delivery completely into passage 38.

When piston 34 is retracted by the actuation of Valve V-1 pressurizing line 44, lane 50 is also pressurized to deliver a stud to delivery conduit 42. Air in gun cylinder 32, in addition to retracting the piston 34, flows through passage portion 48 and delivers a stream of pressure air axially through passage 38 toward and out of collet 30. Subsequent actuation of valve V-2 delivers the stud under air pressure through conduit 42, and as the stud enters through inlet passage 40, it is picked up by the air stream flowing axial of passage 38 and urged toward collet 30. Thereafter four way valve V-1 is reversed, pressurizing line 46 to shift plunger 36 forward, thereby seating the stud in the collet in its welding position as shown in FIG. 1.

What is claimed is:

1. In a stud welding system, a stud welding tool having a stud retaining collet at one end of the tool, a longitudinally extending stud delivery passage in the tool extending rearwardly of said collet and having a laterally opening stud inlet spaced from the collet, a stud feed conduit having a downstream end coupled to the tool with its outlet disposed in spaced aligned confrontation with said passage inlet, a fluid pressure cylinder in said tool spaced rearwardly of said passage, a piston in said cylinder with a plunger rod coupled thereto projecting into said passage for transferring a stud received through said inlet into said stud retaining collet, fluid conducting passageway means establishing communication between said cylinder and the rear end of said stud delivery passage, and means for introducing fluid under pressure into said cylinder to retract said piston and rod and to direct pressure fluid through said passage-way means into the stud delivery passage for urging a stud therein toward said collet.

2. The invention as defined in claim 1 characterized in that said fluid conducting passageway means is disposed in axial alignment between said stud delivery passage and said cylinder and is sized to accommodate said plunger rod, with the rod projecting through the passageway and the pressure fluid delivered therethrough around the rod.

3. The invention as defined in claim 2 characterized in that said fluid pressure cylinder is double acting, having fluid pressure inlets at opposite ends thereof to shift the piston and plunger rod in both directions.

4. The invention as defined in claim 3 characterized in that said system includes stud delivery means connected to said feed conduit for delivering studs therethrough one at a time, electric supply means connected to said tool for supplying welding current thereto, and control means coupled to said delivery means, said electric supply means and said fluid introducing means for controlling the sequential operation of all of said means.

5. The invention as defined in claim 4 characterized in that said control means includes means for actuating the fluid introducing means and the stud delivery means in response to the culmination of a welding operation to deliver a stud and retract the plunger rod and maintain pressure fluid supply through said fluid conducting passageway for a predetermined time sufficient to insure stud delivery through said stud inlet and toward said collect.

* * * * *